C. J. WILLIAMSON.
APPARATUS FOR HANDLING EGGS.
APPLICATION FILED DEC. 27, 1920.

1,379,234.

Patented May 24, 1921.
2 SHEETS—SHEET 1.

INVENTOR.
C. J. Williamson.
BY Acker & Totten
his ATTORNEYS.

C. J. WILLIAMSON.
APPARATUS FOR HANDLING EGGS.
APPLICATION FILED DEC. 27, 1920.
1,379,234.
Patented May 24, 1921.
2 SHEETS—SHEET 2.
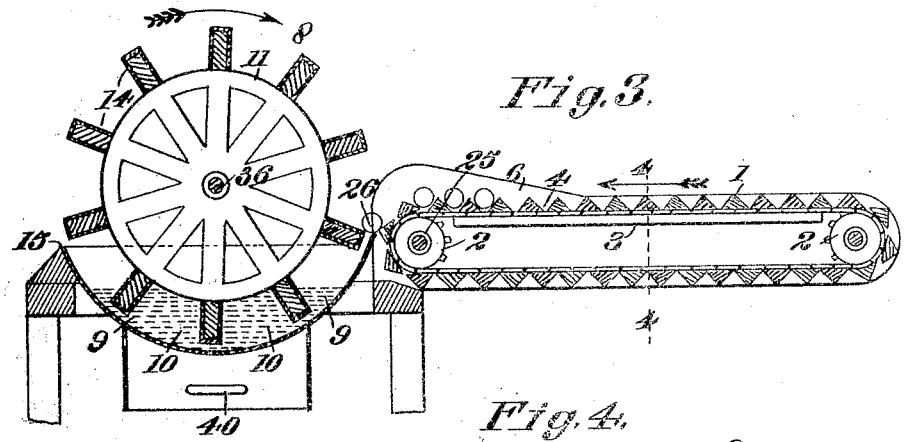
*Fig. 3.*
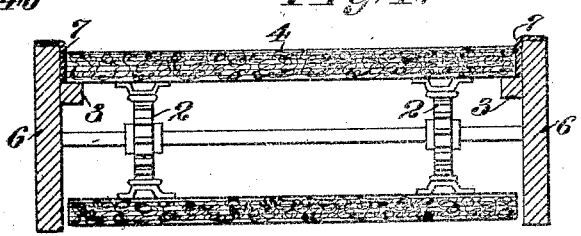
*Fig. 4.*
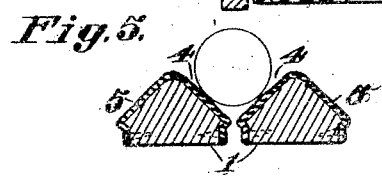
*Fig. 5.*
*Fig. 6.*
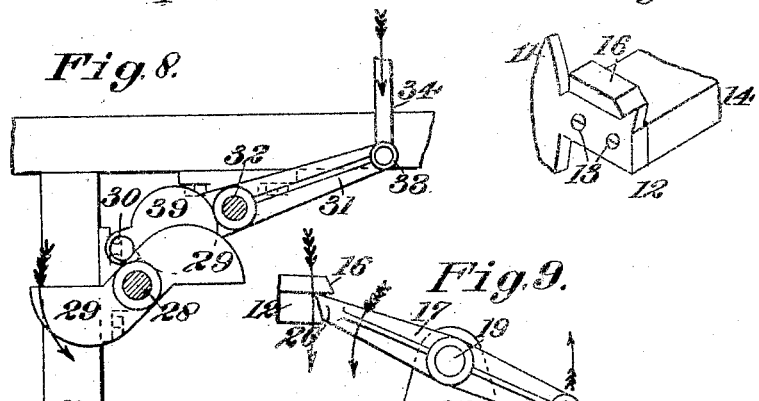
*Fig. 8.*
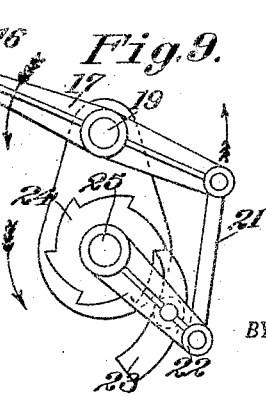
*Fig. 7.*
*Fig. 9.*
INVENTOR.
C. J. Williamson,
BY
ATTORNEYS.

UNITED STATES PATENT OFFICE.

COLONEL J. WILLIAMSON, OF SAN FRANCISCO, CALIFORNIA, ASSIGNOR TO WILLIAMSON MACHINE COMPANY, OF SAN FRANCISCO, CALIFORNIA, A CORPORATION OF CALIFORNIA.

APPARATUS FOR HANDLING EGGS.

1,379,234.      Specification of Letters Patent.      Patented May 24, 1921.

Application filed December 27, 1920. Serial No. 433,527.

*To all whom it may concern:*

Be it known that I, COLONEL J. WILLIAMSON, citizen of the United States, residing at the city and county of San Francisco and State of California, have invented certain new and useful Improvements in Apparatus for Handling Eggs, of which the following is a specification.

The hereinafter described invention relates to means for automatically handling eggs in large quantities and preliminarily to the processing thereof, and the invention resides more particularly in the association of interconnecting working instrumentalities for the receiving and feeding of eggs, and the mechanically washing of the eggs for subsequent uses thereof commercially.

In the treatment of eggs for storage purposes, it is essential for securing the best results that the eggs be thoroughly washed prior to being subjected to the processing operation. Heretofore this washing of the eggs has been done by hand, with the result that owing to the fragile character of the egg many are broken during such manual treatment thereof, and a considerable loss follows from such breakage of the eggs.

The present invention is designed to automatically receive, feed and wash the eggs for the cleaning thereof, and the same resides in means for feeding the eggs in large quantities and in timed relation to associated mechanism which receive the same and advance and propel the received eggs through a cleaning or washing medium, and after the cleaning or washing discharge the eggs on to any suitable mechanism for conveying the same from the washing means.

In its preferred embodiment, the apparatus comprises an endless intermittently traveling belt or conveyer for receiving and advancing the eggs, the said eggs being delivered to or placed on to the said conveyer in any suitable manner; a drum or cylinder mounted for vertical rotation and provided with peripherally disposed egg receiving pockets, said wheel being situated at the discharge end of the endless egg conveyer so that the pockets thereof will receive successively the eggs as discharged from the said conveyer; a tank adapted to contain a body of cleaning or washing liquid, and into which the eggs are submerged and moved therethrough by the vertically disposed rotatable drum; means for imparting intermittent rotation to the said drum, and devices for actuating the conveyer for the eggs in timed relation with the movement of the said drum in order that the delivery of the eggs by the said conveyer and the reception thereof by the drum (hereinafter refererd to as an egg receiving wheel) accurately register at all times during the operation of the apparatus. While the apparatus for the carrying out of the invention for the handling and treatment of eggs is herein referred to for the treatment of the eggs preliminarily to the processing thereof, still the use thereof is not so restricted, and I do not wish to be understood as so limiting the invention, for I am well aware that the invention is capable of being adapted for use wherever eggs are to be handled in quantity and washed mechanically for the removal of foreign material therefrom, and such irrespective as to the subsequent use to be made of the eggs for commercial purposes or otherwise.

To comprehend the invention, reference should be had to the accompanying sheets of drawings wherein an apparatus of preferred embodiment is illustrated, and in said drawings :—

Figure 2:
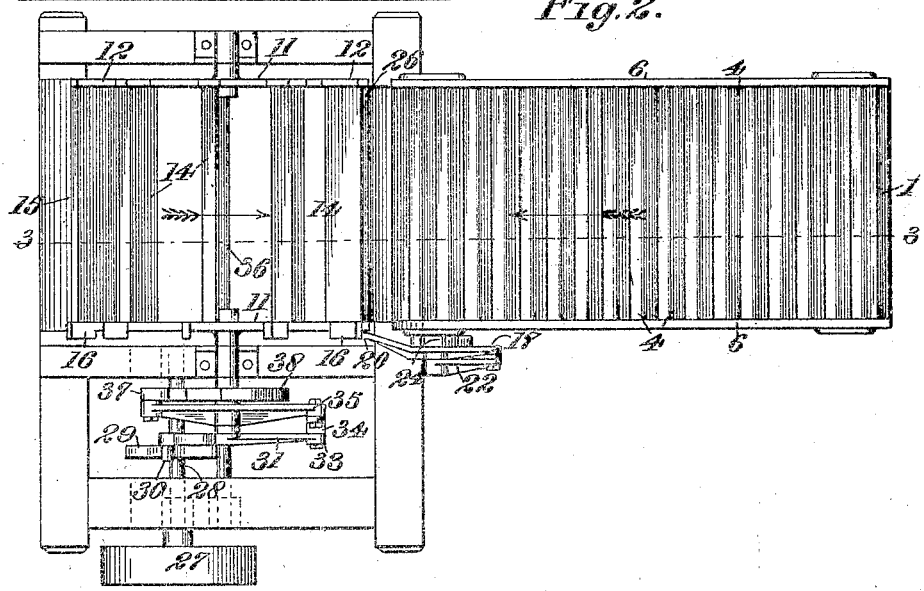
Fig. 2 is a plan view of the mechanism illustrated in Fig. 1 of the drawings.

Fig. 3 is a longitudinal sectional elevation taken on the line 3—3, Fig. 2 of the drawings, the arrows appearing on said view indicating respectively the path of movement of the egg conveyer and rotation of the egg receiving and delivery wall, the said view illustrating the construction of the feed conveyer for the eggs and the general construction of the egg receiving and delivery wheel mounted for rotation at the discharge end of the conveyer and adapted for receiving and advancing the eggs through the body of cleaning liquid held within the tank within which the egg wheel rotates.

Fig. 4 is a cross sectional view in elevation of the conveyer for the eggs, said view being taken on line 4—4 Fig. 3 of the drawings and viewed in the direction of the arrow.

Fig. 5 is an enlarged detail sectional view of a portion of the endless conveyer for the eggs, said view illustrating two of the corrugations of said conveyer with an egg resting therebetween.

Fig. 6 is an enlarged detail sectional view of the end of one of the paddles or vanes of the egg wheel.

Fig. 7 is a part broken perspective view illustrating a part of the vanes of the egg wheel with the projection therefrom and the end of a paddle or vane secured thereto, also showing a cam plate attached thereto for operating the conveyer for the eggs.

Fig. 8 is a side elevation illustrating the means for imparting intermittent rotation to the egg receiving and delivery wheel.

Fig. 9 is a similar view disclosing the mechanism for imparting intermittent movement to the endless conveyer for the eggs.

Figure 1:
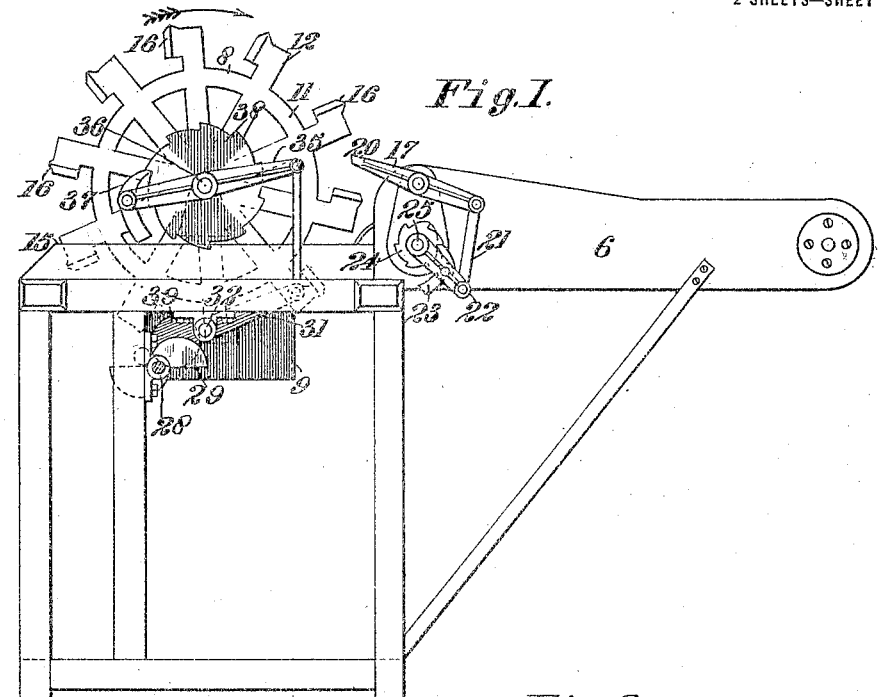
Figure 1 is a side view in elevation of the apparatus for the feeding and cleaning or washing of eggs.

In the drawings the numeral 1 is used to indicate a feed belt and conveyer which is mounted for longitudinal travel on the rollers or sprocket wheels 2, the said belt or conveyer being supported between the said rollers or sprocket wheels 2 by means of a bed 3, Figs. 1, 3 and 4 of the drawings. This belt or conveyer is provided on the upper surface thereof with a series of parallel transversely disposed corrugations 4, which are covered with felt or other cushioning material 5, Fig. 5 of the drawings. The side walls 6 of the belt frame or housing for the endless conveyer 1 serve as the side walls for the said belt or conveyer, and the inner surfaces of said wall members are also provided with cushioning material 7, for those parts which approximate the eggs or in contact with which the eggs come during the movement of the endless traveling conveyer or belt.

At the discharge end of the conveyer or endless traveling belt 1 is mounted for rotation in a vertical plane, an egg receiving and delivery wheel 8, the direction of its rotation relative to the movement of the endless traveling belt or conveyer 1 being disclosed by arrows in Figs. 1, 2 and 3 of the drawings; there being arranged or disposed beneath said wheel a trough or tank 9 adapted to contain water or other cleansing and washing liquid 10. The face plates 11 of the egg receiving and delivery wheel are provided with radial projections 12 to which are secured by screws 13 or otherwise transversely disposed slats or paddles 14. These radial projections together with the transversely disposed blades or paddles 14 form or constitute what may be termed a series of circumferentially disposed peripheral pockets for the egg receiving and delivery wheel, and the function thereof is to successively receive the eggs from the endless traveling belt or conveyer 1 and gradually lower them into a body of liquid 10 contained within the trough or tank 9, and to push or force the eggs so received and delivered into the liquid through the same toward the discharge point 15 of the tank or trough 9, where they are suitably received, by means not here shown, to be conveyed to any suitable place of deposit for use in the subsequent treatment thereof for commercial purposes.

It will be understood that the eggs are received from the endless traveling conveyer or belt into one of the pockets of the egg receiving and delivery wheel situated at such time to receive the eggs discharged from said conveyer or belt, and by such are lowered into the body of liquid 10, and that the succeeding blade or paddle of an adjacent pocket of the egg receiving and delivery wheel serves to push and propel the said eggs through the body of said liquid toward the discharge point of the tank or trough 9 to elevate the same therefrom.

There is a cam plate 16 associated with each pocket of the egg receiving and delivery wheel, which said cam plate projects therefrom and serves to actuate the mechanism for imparting intermittent travel to the endless conveyer or belt 1, and which movement is imparted in the following manner:—There is an oscillatory lever 17 (Figs. 1, 2 and 9 of the drawings) pivotally disposed at 19 at any suitable point relative to the frame or housing for the endless traveling belt or conveyer 1. There is attached or secured to the free end of the said lever 17 a tappet 20, which is so positioned relatively thereto as to lie within the path of movement of the cams 16 secured to and projecting from the pockets of the egg receiving and delivery wheel 8, so that during the rotary movement of said wheel the tappet 20 is successively engaged by the cams 16 projecting from the pockets of the wheel. The opposite end of the lever 16 is connected by a link 21 to a radius bar or arm 22, which said bar carries a pawl 23 for engagement with a ratchet wheel 24 for rotating the same with an intermittent motion. Said ratchet wheel is fast to a shaft 25 to which is secured the belt or sprocket wheel 2 for the discharge end portion of the endless conveyer or belt 1, and the step motion imparted to the ratchet wheel 24 in turn has its intermittent motion imparted to the shaft 25 for operating the sprocket or belt wheel thereon for giving an intermittent movement or travel to the endless belt or conveyer 1. Intermittent movement is thus imparted to the said belt or conveyer 1 by intermittent rotary motion transmitted to the egg receiving and delivery wheel 8, through the medium of the cam plates 16, the tappet 20 and the parts described in association therewith.

It will be understood that all of these coacting interworking parts are so adjusted relative one to the other that the eggs resting on the belt or conveyer 1 within the transversely disposed grooves formed by the corrugations 4 are delivered by the said belt or conveyer accurately at the discharge point 25 onto or into one of the pockets of the egg receiving and delivering wheel 8, and variation of adjustment can be effected by shifting the pivotal pin of the pawl 23 longitudinally relative to the radius bar 22.

The egg receiving and delivery wheel 8 has rotary motion imparted thereto from a power driven shaft 28, which is driven by means of a belt (not shown) working over a belt pulley 27 secured to the outer end of said shaft 28. On the shaft 28 is secured a tappet cam 29, which cam during the rotary movement of the shaft 28 engages with a cam roller 30 secured to and projecting from a fulcrumed lever 31, which lever is fulcrumed to the frame of the apparatus at 32. To the end 33 of the lever 31 is pivotally connected a pitman 34 which at its opposite end is connected to one end of a pivoted lever 35 secured to the shaft 36 of the egg receiving and delivery wheel 8. The said lever 35 at its outer end carries a pawl or dog 37 which is adapted to engage with a ratchet wheel 38 made fast on the shaft 36. As the tappet cam 29 imparts oscillation to the lever 31 through the medium of the described mechanism, the egg receiving or delivery wheel 8 has an intermittent or stepped rotation imparted thereto, there being associated with the lever 31 a counterpoise 39 in order to restore the lever 31 to normal position when the same is not being acted on by the tappet cam 29. Inasmuch as at times it may be desirable to employ warm or heated liquid in connection with the treatment of cleansing or washing the eggs, there is provided a heater 40, which is positioned beneath the tank or trough 9, and is adapted for heating the liquid contents thereof should such be found desirable or necessary during the handling of the eggs.

Owing to the longitudinally disposed channel guides or grooves associated with the receiving surface of the endless traveling conveyer or belt 1, care is not required in the delivery of the eggs on to the said belt or conveyer 1, due to the fact that however they may be delivered thereto, the said eggs will appear on the upper surface of the belt or conveyer as transversely disposed rows of eggs, each row being maintained separate and distinct from its adjacent row by reason of the transversely disposed spaced ribs or projections of the belt or conveyer, and the eggs so disposed will be delivered successively into the respective pockets of the egg receiving and delivery wheel as rows of eggs, and as such will be maintained distinct and separate during the immersion of the same within the bath or body of liquid contained within the tank or trough 9, and as such forced therethrough and delivered from within the said tank or trough.

It will be understood that there is a covering or cushioning protector 14' applied to the face of each paddle or blade 14 of the respective pockets of the egg receiving and delivery wheel, the purpose thereof being to prevent injury to the eggs as handled thereby.

While I have illustrated a convenient and efficient form of pockets for the egg receiving and delivery wheels, I am well aware of the fact that any form of egg receiving pocket may be utilized in connection with said wheel.

While I have illustrated and described the preferred embodiment of an apparatus for the successful and efficient handling of the eggs to be cleaned or washed, still I do not wish to be understood as limiting or confining the invention to the detailed construction of the said interconnected working parts as herein described, for I am well aware that various changes may be made in the working parts of the said apparatus without departing from the nature and spirit of the invention, and I further wish to be understood as claiming the same as broadly as the state of the art will warrant.

While I have used the term "washing" as applied to the handling of eggs, it will be understood that the body of liquid 10 contained within the tank or trough 9 is not necessarily restricted to a washing medium, inasmuch as the same may comprise a body of oil or other liquid employed in connection with the processing of eggs.

Having thus described my invention what I claim and desire to secure by Letters Patent of the United States is:—

1. An apparatus for treating eggs, the same comprising an egg receiving and conveying carrier, an egg receiving wheel provided with a series of peripheral egg receiving pockets and situated at the discharge end of the said carrier and adapted to receive in the pockets thereof successively eggs discharging therefrom, and means acted on by the receiving wheel during the rotary movement thereof for operating the said parts in synchronous registry.

2. An apparatus for treating eggs, the same comprising an egg receiving and conveying belt provided with parallel transversely disposed corrugations, an egg receiving wheel provided peripherally with transversely disposed egg receiving pockets, said wheel being situated at the discharge end of the said belt and adapted to receive the eggs as discharged therefrom, and means for operating said parts in synchronous registry.

3. An apparatus for treating eggs, the same comprising an egg receiving and conveying belt provided with a series of transversely disposed corrugations, an egg receiving wheel situated at the discharge end of the said belt and provided with transversely disposed paddles forming a series of spaced circumferentially disposed egg receiving pockets, said corrugations and paddles being protected with cushioning material, and means for operating the said wheel and belt in synchronous registry.

4. An apparatus for the treating of eggs, the same comprising an egg receiving and conveying belt, an egg receiving wheel situated at the discharge end of the said belt and adapted to receive directly eggs discharging therefrom, a reservoir adapted to contain a liquid body and within which the wheel is mounted for rotation, said wheel adapted to convey the eggs into, through and out of the liquid body within the reservoir.

5. An apparatus for treating eggs, the same comprising an endless traveling egg carrier, a reservoir situated at the discharge end of said carrier and adapted to contain a liquid body, means associated with said reservoir for receiving the eggs as discharged from the carrier and conveying the same into, through and out of the liquid body within the reservoir, means adapted to warm said liquid body, and mechanism for actuating the egg carrier and the egg receiving and conveying means.

6. An apparatus for the described purpose, the same comprising a conveying belt, a ratchet wheel adapted by its rotation to move said belt, a receiving wheel provided with a cam, an arm having a tappet in the path of said cam, said arm operatively connected with said ratchet wheel.

7. An apparatus for the described purpose, the same comprising a conveying belt, provided on its receiving face with a series of spaced transversely disposed projections, a receiving wheel having paddles, a trough adapted to contain liquid, means adapted to operate said wheel and belt in synchronous registry, said paddles adapted to receive articles on their upper surfaces, and to push said articles through said liquid to a point of discharge.

8. An apparatus for treating eggs, the same comprising an egg receiving and conveying belt, an egg receiving wheel situated at the discharge end of said belt and adapted to receive eggs discharging therefrom, mechanism thrown into operation by the movement of said wheel and adapted to give said belt an intermittent feeding movement for actuating the same in timed relation to the movement of the wheel.

9. An apparatus for the described purpose, the same comprising an egg receiving and conveying belt, a wheel adapted to receive eggs as discharged from said belt, mechanism adapted to give said wheel an intermittent rotation from a source of power, mechanism operated by said wheel adapted to give said belt an intermittent movement, and means for synchronizing said movements.

10. The combination with a tank adapted to contain a body of liquid, mechanism for receiving and feeding eggs to a point of discharge relative to said tank, means for receiving the discharging eggs for lowering the same into the tank, forcing the same through the liquid contained therein and conveying the eggs to a discharge from the tank, and mechanism for actuating said means and the egg feeding means in timed relation.

11. In an apparatus for the described purpose, the combination with egg receiving and feeding elements, of an egg receiving and delivery wheel adapted to receive eggs from said element, said wheel provided with a series of circumferentially disposed egg receiving pockets, and means for actuating said wheel and the egg receiving and feeding element in timed relation.

12. An apparatus for the described purpose, the same comprising an intermittent movable feed conveyer provided with a series of transversely disposed spaced parallel projections on the receiving face thereof, means for imparting longitudinal movement thereto, an egg receiving and delivery wheel associated with said conveyer and provided with a series of circumferentially disposed pockets for receiving successively eggs as discharged from the conveyer, and mechanism for actuating the said wheel and the conveyer in timed relation.

13. An apparatus for receiving, wetting and discharging wetted eggs, the same comprising a reservoir adapted to contain a liquid body, a receiver associated with the reservoir for conveying eggs into, through and out of said liquid body, mechanism for delivering eggs directly onto said receiver, and means for operating the receiver and egg delivery mechanism in synchronism.

14. An apparatus for receiving, wetting and discharging wetted eggs, the same comprising a reservoir adapted to contain a liquid body, a receiver associated with the reservoir for conveying eggs into, through and out of said liquid body, means for heating the liquid body, and mechanism for delivering eggs in timed relation to the egg receiver.

15. An apparatus for treating eggs, the same comprising a reservoir adapted to contain a liquid body, a carrier for receiving and advancing eggs toward said reservoir, a receiver associated with the reservoir for directly receiving eggs as discharged from the carrier and adapted to convey the same into, through and out of the liquid body within the reservoir, and mechanism for operating the egg carrier and the egg receiver in timed relation.

16. An apparatus for treating eggs, the same comprising a reservoir adapted to contain a liquid body, a rotary egg receiver provided with transversely disposed peripheral egg receiving pockets mounted for rotation within the reservoir partly submerged in the liquid body thereof, said receiver adapted to convey eggs into, through and out of the liquid body of the reservoir, and mechanism for actuating said egg receiver.

In testimony whereof I have signed my name to this specification.

COLONEL J. WILLIAMSON.